US012606704B2

(12) United States Patent
Oya

(10) Patent No.: US 12,606,704 B2
(45) Date of Patent: Apr. 21, 2026

(54) MOLDED ARTICLE FOR PLUMBING AND METHOD

(71) Applicant: KURARAY CO., LTD., Okayama (JP)

(72) Inventor: Nobuhiro Oya, Tsukuba (JP)

(73) Assignee: KURARAY CO., LTD., Okayama (JP)

( * ) Notice: Subject to any disclaimer, the term of this patent is extended or adjusted under 35 U.S.C. 154(b) by 891 days.

(21) Appl. No.: 17/797,513

(22) PCT Filed: Feb. 8, 2021

(86) PCT No.: PCT/JP2021/004474
§ 371 (c)(1),
(2) Date: Aug. 4, 2022

(87) PCT Pub. No.: WO2021/161937
PCT Pub. Date: Aug. 19, 2021

(65) Prior Publication Data

US 2023/0060402 A1 Mar. 2, 2023

(30) Foreign Application Priority Data

Feb. 10, 2020 (JP) ................................ 2020-020926

(51) Int. Cl.
*C08L 77/06* (2006.01)

(52) U.S. Cl.
CPC ......... *C08L 77/06* (2013.01); *C08L 2205/025* (2013.01)

(58) Field of Classification Search
CPC ........ C08G 69/265; C08K 3/04; C08K 3/346; C08K 5/1345; C08K 7/14; E03C 1/025; C08L 2205/025; C08L 77/06
See application file for complete search history.

(56) References Cited

U.S. PATENT DOCUMENTS

2011/0263777 A1 10/2011 Nakagawa
2015/0274935 A1 10/2015 Hewel
2016/0304696 A1 10/2016 Ieda et al.
2017/0275459 A1 9/2017 Hewel et al.

FOREIGN PATENT DOCUMENTS

EP 2 759 562 A1 7/2014
JP S55-75437 A 6/1980
JP H8-157610 A 6/1996
JP 2007-246563 A 9/2007
JP 2008-266434 A 11/2008
JP 2015-196836 A 11/2015
JP 2017-193703 A 10/2017
WO WO 2010/087192 A1 8/2010
WO 2019/059357 A1 3/2019

OTHER PUBLICATIONS

Office Action issued in EP Patent Application No. 21753328.0, Nov. 24, 2023.
ISR for PCT/JP2021/004474, dated Apr. 20, 2021.
Takiguchi et al., "Reactions of Antioxidants (BHA and BHT) with Chlorine in Aqueous Solution and Mutagenic Assay of the Reaction Products", Journal of Environmental Chemistry, 16(2):219-228 (2006) [English Abstract; cited in ISR].

*Primary Examiner* — Ana L. Woodward
(74) *Attorney, Agent, or Firm* — GREENBLUM & BERNSTEIN, P.L.C.

(57) ABSTRACT

There is provided a molded article for water related application which can prevent molecular cleavage of polyamide caused by a radical generated from a chlorine-based oxidizing substance contained for sterilization in tap water, thereby preventing a degradation in the performance of the molded article. The molded article for water related application comprises a resin composition comprising; 100 parts by mass of a semi-aromatic polyamide (A); 10 to 200 parts by mass of an inorganic filler (B); and 0.1 to 2.0 parts by mass of a phenolic antioxidant (C), wherein the semi-aromatic polyamide (A) includes dicarboxylic acid units composed mainly of aromatic dicarboxylic acid units, and diamine units composed mainly of aliphatic diamine units, and wherein the phenolic antioxidant (C) has, in the molecule, a structure represented by the following formula (1);

(1)

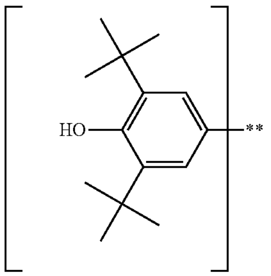

where ** represents a linking moiety.

7 Claims, No Drawings

MOLDED ARTICLE FOR PLUMBING AND METHOD

TECHNICAL FIELD

The present invention relates to a molded article for plumbing (water related application) and a method.

BACKGROUND ART

Materials comprising a polyamide and an inorganic filler are widely used for their excellent properties and ease of melt molding, and are sometimes used in water related application where the materials are used in an environment in which they contact tap water. In such water related application, materials are required to be resistant not only to water but also to a chlorine-based oxidizing substance, such as hypochlorous acid or a hypochlorite, contained for sterilization in tap water. However, a polyamide has the problem of a degradation in performance due to molecular cleavage caused by a radical generated from a chlorine-based oxidizing substance contained for sterilization in tap water. There is, therefore, a strong demand for a polyamide material which is excellent in resistance to water and to a chlorine-based oxidizing substance.

For example, PTL 1 discloses a long fiber-reinforced material comprising a glass fiber bundle impregnated with a molten polyamide resin. The glass fiber bundle has been surface-treated with a treatment agent consisting of a copolymer of an unsaturated mono- or dicarboxylic acid and at least one unsaturated monomer, and a silane coupling agent. PTL 2 discloses a glass fiber-reinforced polyamide resin composition comprising 40 to 20 parts by weight of a polyamide resin, 60 to 80 parts by weight of glass fibers having a flattened cross-sectional shape with a flatness degree of 1.5 to 8, and a polyamide-reactive silane coupling agent which has been added upon melt-kneading of the composition in an amount of 0.1 to 1.0% by weight of the amount of the glass fibers. PTL 3 discloses a polyamide molding composition for use in articles in the field of drinking water.

CITATION LIST

Patent Literature

PTL 1: JP H8-157610A
PTL 2: WO 2010/87192
PTL 3: JP 2015-196836A

SUMMARY OF INVENTION

Technical Problem

The long fiber-reinforced material of PTL 1 has enhanced water resistance. However, the document is silent as to the resistance of the material to a chlorine-based oxidizing substance. In the glass fiber-reinforced polyamide resin composition of PTL 2, the silane coupling agent is added upon melt-kneading of the composition to enhance the adhesion between the polyamide resin and the glass fibers. However, the document is silent as to the resistance of the composition to water and to a chlorine-based oxidizing substance. PTL 3 is also silent as to the resistance of the polyamide molding composition to a chlorine-based oxidizing substance.

The present invention has been made in view of the above situation. It is therefore an object of the present invention to provide a molded article for water related application, a method for using the molded article for water related application, and a method for using a particular resin composition or a molded article of the resin composition, which can prevent molecular cleavage of polyamide caused by a radical generated from a chlorine-based oxidizing substance contained for sterilization in tap water, thereby preventing a degradation in the performance of the molded article.

Solution to Problem

The present inventors, through intensive studies, have found that the above problem can be solved by adding a phenolic antioxidant having a particular structure to a resin composition, and, after making studies based on the finding, have accomplished the present invention.

Thus, the present invention provides the following [1] to [10].

[1] A molded article for water related application, comprising a resin composition comprising; 100 parts by mass of a semi-aromatic polyamide (A); 10 to 200 parts by mass of an inorganic filler (B); and 0.1 to 2.0 parts by mass of a phenolic antioxidant (C), wherein the semi-aromatic polyamide (A) includes dicarboxylic acid units composed mainly of aromatic dicarboxylic acid units, and diamine units composed mainly of aliphatic diamine units, and wherein the phenolic antioxidant (C) has, in the molecule, a structure represented by the following formula (1);

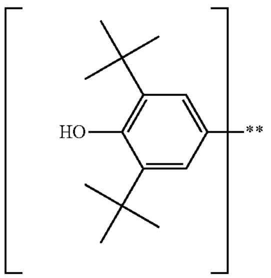

(1)

where ** represents a linking moiety.

[2] The molded article for water related application as described in [1] above, wherein the resin composition contains the phenolic antioxidant (C) in an amount of 0.1 to 1.0 parts by mass per 100 parts by mass of the semi-aromatic polyamide (A).

[3] The molded article for water related application as described in [1] or [2] above, wherein 50 to 100 mol % of the dicarboxylic acid units are structural units derived from at least one of terephthalic acid and naphthalenedicarboxylic acid, and 60 to 100 mol % of the diamine units are structural units derived from an aliphatic diamine having 4 to 10 carbon atoms.

[4] The molded article for water related application as described in any one of [1] to [3] above, wherein the phenolic antioxidant (C) further has at least one of an ester group and an amide group.

[5] The molded article for water related application as described in any one of [1] to [4] above, having a thickness of 0.5 mm or more.

[6] A method comprising using the molded article for water related application as described in any one of [1] to [5] above in an environment where it contacts water containing at least one of hypochlorous acid and a hypochlorite.

[7] A method comprising using a resin composition or a molded article of the resin composition in an environment where it contacts water containing at least one of hypochlorous acid and a hypochlorite, wherein the resin composition contains a phenolic antioxidant (C) having, in the molecule, a structure represented by the following formula (1):

(1)

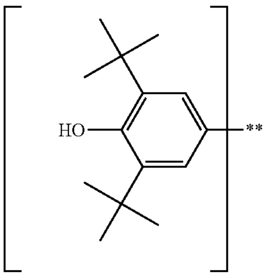

where ** represents a linking moiety.

[8] The method as described in [7] above, wherein the resin composition further contains a polyamide (D).

[9] The method as described in [8] above, wherein the polyamide (D) is a semi-aromatic polyamide (A) including dicarboxylic acid units composed mainly of aromatic dicarboxylic acid units, and diamine units composed mainly of aliphatic diamine units.

[10] The method as described in [9] above, wherein the semi-aromatic polyamide (A) includes dicarboxylic acid units composed mainly of aromatic dicarboxylic acid units, and diamine units composed mainly of aliphatic diamine units having 4 to 10 carbon atoms.

Advantageous Effects of Invention

The present invention makes it possible to provide a molded article for water related application, a method for using the molded article for water related application, and a method for using a particular resin composition or a molded article of the resin composition, which can prevent molecular cleavage of polyamide caused by a radical generated from a chlorine-based oxidizing substance contained for sterilization in tap water, thereby preventing a degradation in the performance of the molded article.

The molded article for water related application of the present invention can prevent molecular cleavage of polyamide caused by a radical generated from a chlorine-based oxidizing substance contained for sterilization in tap water, thereby preventing a degradation in the performance of the molded article. Therefore, the molded article for water related application of the present invention can be advantageously used in faucet applications, cooking appliances, where it can contact tap water, a fluid containing tap water, or a food containing tap water.

Examples of the faucet applications include a housing of an appliance for transporting tap water; a housing of an appliance for storing tap water; a filter casing housing; a tap housing; a pipe housing; a housing of a bathroom faucet (such as a hot and cold water switching valve or a flow rate switching valve); a housing of a sanitary appliance; a kitchen faucet housing; a water heater housing; a valve part (a shut-off ball, a slide, a cylinder) or a housing of a valve part; a housing of a water shut-off valve of a toilet tank; a housing in a shower head; a valve housing of a water heater; a joint of house piping (e.g. underfloor piping); a joint of a bathroom faucet; a joint of tap piping; a pipe joint; a water meter housing; a water meter part (a bearing, a propeller, a pin) and a water meter; a gas meter housing; a distributor housing; a valve/pump housing of a household device; a steam-resistant part of a steam iron; a pump housing; a pump part (e.g. a turbine wheel or an impeller); a housing of a water supply system (such as a hot-water storage tank); a housing of a heating system; a housing of a cooling system; a water flow control valve; a pressure reducing valve; a relief valve; a solenoid valve; a three-way valve; a thermostatic valve; a water temperature sensor; a water flow sensor; and a tub adapter.

Examples of the cooking appliances include a valve/pump housing of a tea or coffee maker; a valve/pump housing of a cooking appliance (such as a rice cooker or a steamer); a steam-resistant part (such as a top lid of a rice cooker) of a cooking appliance (such as a rice cooker or a steamer); a sliding part (such as a gear) of a cooking appliance (such as a rice cooker or a steamer); a sliding part (such as a gear of a gear pump) of a commercial cooking utensil; and a steam-resistant part (such as a pipe of a commercial rice cooker) of a commercial cooking utensil.

DESCRIPTION OF EMBODIMENTS

Exemplary embodiments of the present invention will now be described. Numerical values specified herein can be determined by the methods disclosed in the embodiments and the below-described experimental examples. Other embodiments will fall within the scope of the present invention as long as they meet the concept of the present invention.

The present invention will be described in detail. Features described herein as preferred can be employed arbitrarily. A combination of preferred features is more preferred.

As used herein, the expression "XX to YY" means "XX or more and YY or less".

Lower limit values and upper limit values, which are set forth herein in a stepwise manner in preferable numerical ranges (e.g., content ranges), can be combined independently. For example, from the phrase "preferably 10 to 90, more preferably 30 to 60", the "preferable lower limit value (10)" and the "more preferable upper limit value (60)" can be combined into the range "10 to 60".

As used herein, "x units" ("x" represents a monomer) refer to "structural units derived from x". For example, "propylene units" refer to "structural units derived from propylene".

As used herein, "composed mainly of" means that the units constitute 50 to 100 mol %, preferably 60 to 100 mol % of all the units.

As used herein, "number of carbon atoms per amide group" refers to the average of the number of all the carbon atoms (including the carbon atom of an amide group), contained in each repeating unit, per amide group.

Water which contains at least one of hypochlorous acid and a hypochlorite, even in a trace amount, herein corresponds to "water containing at least one of hypochlorous acid and a hypochlorite". The total content of hypochlorous acid and a hypochlorite is generally 0.01 ppm or more and 10000 ppm or less.

<Molded Article for Water Related Application>

The molded article for water related application of the present invention is a molded article for water related application, comprising a resin composition comprising; 100 parts by mass of a semi-aromatic polyamide (A); 10 to 200 parts by mass of an inorganic filler (B); and 0.1 to 2.0 parts by mass of a phenolic antioxidant (C), wherein the semi-aromatic polyamide (A) includes dicarboxylic acid units composed mainly of aromatic dicarboxylic acid units, and diamine units composed mainly of aliphatic diamine units, and wherein the phenolic antioxidant (C) has, in the molecule, a structure represented by the following formula (1);

(1)

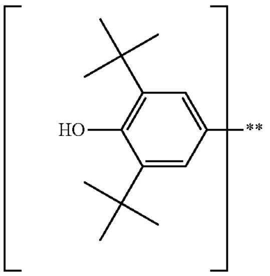

where ** represents a linking moiety.

According to the present invention, the use of the phenolic antioxidant having a particular structure in the resin composition can prevent molecular cleavage of polyamide caused by a radical generated from a chlorine-based oxidizing substance contained for sterilization in tap water, thereby preventing a degradation in the performance of the molded article.

“Water” associated with the “molded article for water related application” herein includes not only liquid water but water vapor as well. The “molded article for water related application” herein includes not only a molded article which contacts liquid water but also a molded article which contacts water vapor (e.g., a top lid of a rice cooker or a steam-resistant member of a steam iron).

The molded article for water related application can be obtained by molding the resin composition using a molding method such as injection molding, blow molding, extrusion molding, compression molding, stretch molding, vacuum molding, foam molding, rotational molding, impregnation, laser sintering, or fused deposition modeling. The molded article for water related application can also be obtained by subjecting the above mentioned resin composition and a polymer, etc. to composite molding.

There is no particular limitation on the molded article for water related application as long as it is a molded article for use in an environment where it contacts water. Exemplary articles include a joint, a steam-resistant part, a film, a sheet, a tube, a pipe, a sliding part such as a gear, a cam, various housings, a roller, an impeller, a bearing retainer, a spring holder, a clutch part, a chain tensioner, a tank, a wheel, a capacitor, a jack, and an LED reflector.

While there is no particular limitation on the thickness of the molded article for water related application, it is preferably 0.5 mm or more, more preferably 0.8 mm or more, and especially preferably 1.0 mm or more from the viewpoint of water pressure resistance.

[Semi-Aromatic Polyamide]

The semi-aromatic polyamide is a polyamide including dicarboxylic acid units composed mainly of aromatic dicarboxylic acid units, and diamine units composed mainly of aliphatic diamine units.

The content of the aromatic dicarboxylic acid units in the dicarboxylic acid units constituting the semi-aromatic polyamide is preferably in the range of 50 to 100 mol %, more preferably in the range of 60 to 100 mol %, even more preferably in the range of 75 to 100 mol %, and especially preferably in the range of 90 to 100 mol % from the viewpoint of good chemical resistance and good heat resistance of the semi-aromatic polyamide.

The aromatic dicarboxylic acid units are those derived from: terephthalic acid; naphthalenedicarboxylic acid such as 2,6-naphthalenedicarboxylic acid, 2,7-naphthalenedicarboxylic acid or 1,4-naphthalenedicarboxylic acid; isophthalic acid; 1,4-phenylenedioxydiacetic acid; 1,3-phenylenedioxydiacetic acid; diphenic acid; diphenylmethane-4,4'-dicarboxylic acid; diphenylsulfone-4,4'-dicarboxylic acid; 4,4'-biphenyldicarboxylic acid; and the like. These compounds may be used either singly or in a combination of two or more.

Among them, terephthalic acid and naphthalenedicarboxylic acid are preferred. The naphthalenedicarboxylic acid is preferably 2,6-naphthalenedicarboxylic acid.

The total content of terephthalic acid units and naphthalenedicarboxylic acid units in the dicarboxylic acid units constituting the semi-aromatic polyamide is preferably 50 to 100 mol %, more preferably 60 to 100 mol %, even more preferably 75 to 100 mol %, and still more preferably 90 to 100 mol %. When the total content of terephthalic acid units and naphthalenedicarboxylic acid units in the dicarboxylic acid units is within the above range, the molded article has high strength and a low water absorption rate.

The dicarboxylic acid units, constituting the semi-aromatic polyamide, may include dicarboxylic acid units other than the aromatic dicarboxylic acid units preferably in an amount of less than 50 mol %. Examples of such other dicarboxylic acid units include units derived from an aliphatic dicarboxylic acid such as oxalic acid, malonic acid, succinic acid, glutaric acid, adipic acid, pimelic acid, suberic acid, azelaic acid, sebacic acid, undecanedicarboxylic acid, dodecanedicarboxylic acid, dimethylmalonic acid, 2,2-diethylsuccinic acid, 2,2-dimethylglutaric acid, 2-methyladipic acid, or trimethyladipic acid; and units derived from an alicyclic dicarboxylic acid such as 1,3-cyclopentanedicarboxylic acid, 1,3-cyclohexane dicarboxylic acid, 1,4-cyclohexanedicarboxylic acid, cycloheptanedicarboxylic acid, cyclooctanedicarboxylic acid, or cyclodecanedicarboxylic acid. These compounds may be used either singly or in a combination of two or more. The content of such other dicarboxylic acid units in the dicarboxylic acid units is preferably 25 mol % or less, more preferably 10 mol % or less. The semi-aromatic polyamide for use in the present invention may also contain units derived from a polycarboxylic acid such as trimellitic acid, trimesic acid or pyromellitic acid as long as the semi-aromatic polyamide is melt-moldable.

The content of the aliphatic diamine units in the diamine units constituting the semi-aromatic polyamide is preferably 60 to 100 mol %, more preferably 75 to 100 mol %, and especially preferably 90 to 100 mol % from the viewpoint of obtaining a resin composition which is excellent in toughness, heat resistance, chemical resistance, and lightness.

While there is no particular limitation on the aliphatic diamine units, they are preferably structural units derived from an aliphatic diamine having 4 to 10 carbon atoms, more preferably structural units derived from an aliphatic diamine having 6 to 10 carbon atoms from the viewpoint of excellent strength and low water absorption properties of the molded article, and especially preferably structural units derived from an aliphatic diamine having 9 or 10 carbon atoms from the viewpoint of preventing a dimensional change of the molded article on absorption of water.

The content of the structural units derived from an aliphatic diamine having 4 to 10 carbon atoms in the diamine units constituting the semi-aromatic polyamide is preferably 60 to 100 mol %, more preferably 75 to 100 mol %, and especially preferably 90 to 100 mol %. When the content of the structural units derived from an aliphatic diamine having 4 to 10 carbon atoms in the diamine units is within the above range, a resin composition excellent in toughness, heat resistance, chemical resistance, and lightness can be obtained.

Examples of the aliphatic diamine having 4 to 10 carbon atoms include a linear aliphatic diamine such as 1,4-butanediamine, 1,5-pentanediamine, 1,6-hexanediamine, 1,7- heptanediamine, 1,8-octanediamine, 1,9-nonanediamine, or 1,10-decanediamine; and a branched aliphatic diamine such as 2-methyl-1,5-pentanediamine, 3-methyl-1,5-pentanediamine, 2,2,4- trimethyl-1,6-hexanediamine, 2,4, 4- trimethyl-1,6- hexanediamine, 2-methyl-1,8-octanediamine, or 5-methyl-1,9-nonanediamine. These compounds may be used either singly or in a combination of two or more.

Among them is more preferred at least one selected from 1,4-butanediamine, 1,6-hexanediamine, 1,9- nonanediamine, 2- methyl-1,8-octanediamine, and 1,10-decanediamine. It is preferred to use at least one of 1,9-nonanediamine and 2-methyl-1,8-octanediamine, and more preferred to use them together because a resin composition which is superior in heat resistance, low water absorption properties and chemical resistance can be obtained. When 1,9-nonanediamine and 2-methyl-1,8-octanediamine are used together, the molar ratio between 1,9-nonanediamine and 2-methyl-1,8-octanediamine is preferably 99:1 to 1:99, more preferably 95:5 to 50:50, even more preferably 90:10 to 75:25, and especially preferably 85:15 to 78:22. When the molar ratio between 1,9-nonanediamine and 2-methyl-1,8-octanediamine is within the above range, the molded article can have high strength and low water absorption properties.

The content of the aliphatic diamine in the total amount of the monomers constituting the semi-aromatic polyamide is preferably 30 to 55 mol %, more preferably 40 to 55 mol %, while the content of the aromatic dicarboxylic acid is preferably 30 to 55 mol %, more preferably 40 to 55 mol %.

The diamine units, constituting the semi-aromatic polyamide, may include diamine units other than the aliphatic diamine units preferably in an amount of less than 50 mol %. Examples of such other diamine units include units derived from an alicyclic diamine such as cyclohexanediamine, methylcyclohexanediamine, or isophoronediamine; and units derived from an aromatic diamine such as p-phenylenediamine, m-phenylenediamine, xylylenediamine, 4,4'-diaminodiphenylmethane, 4,4'-diaminodiphenylsulfone, or 4,4'-diaminodiphenyl ether. These compounds may be used either singly or in a combination of two or more. The content of such other diamine units in the diamine units is preferably 25 mol % or less, more preferably 10 mol % or less.

The semi-aromatic polyamide may also contain aminocarboxylic acid units and/or lactam units as long as the effect of the present invention is not impaired.

The aminocarboxylic acid units are, for example, those derived from 11-aminoundecanoic acid or 12-aminododecanoic acid. Two or more types of aminocarboxylic acid units may be contained in the semi-aromatic polyamide. The content of aminocarboxylic acid units in the semi-aromatic polyamide is preferably 40 mol % or less, more preferably 20 mol % or less, and even more preferably 10 mol % or less per 100 mol % of all the monomer units constituting the semi-aromatic polyamide.

The semi-aromatic polyamide may contain lactam units as long as the effect of the present invention is not impaired. The lactam units are, for example, those derived from ε-caprolactam, enanthlactam, undecanelactam, lauryllactam, α-pyrrolidone, or α-piperidone. Two or more types of lactam units may be contained in the semi-aromatic polyamide. The content of lactam units in the semi-aromatic polyamide is preferably 40 mol % or less, more preferably 20 mol % or less, and even more preferably 10 mol % or less per 100 mol % of all the monomer units constituting the semi-aromatic polyamide.

Typical examples of the semi-aromatic polyamide (A), including dicarboxylic acid units composed mainly of aromatic dicarboxylic acid units, and diamine units composed mainly of aliphatic diamine units, may include polytetramethylene terephthalamide (polyamide 4T), polypentamethylene terephthalamide (polyamide 5T), polyhexamethylene terephthalamide (polyamide 6T), polynonamethylene terephthalamide (polyamide 9T), poly(2-methyloctamethylene) terephthalamide (nylon M8T), polynonamethylene terephthalamide/poly(2-methyloctamethylene) terephthalamide copolymer (nylon 9T/M8T), polynonamethylenenaphthalene dicarboxamide (polyamide 9N), polynonamethylenenaphthalene dicarboxamide/poly(2-methyloctamethylene)naphthalene dicarboxamide copolymer (nylon 9N/M8N), polydecamethylene terephthalamide (polyamide 10T), polyhexamethylene isophthalamide (polyamide 6I), a copolymer of polyamide 6I and polyamide 6T (polyamide 6I/6T), a copolymer of polyamide 66, polyamide 6I and polyamide 6T (polyamide 66/polyamide 6I/6T), a copolymer of polyamide 6T and polyundecanamide (polyamide 11) (polyamide 6T/11), a copolymer of polyamide 6T and polyamide 10T (polyamide 6T/10T), and a copolymer of polyamide 10T and polyundecanamide (polyamide 11) (polyamide 10T/11).

Among them is preferred at least one selected from polynonamethylenenaphthalene dicarboxamide (polyamide 9N), polynonamethylenenaphthalene dicarboxamide/poly (2-methyloctamethylene)naphthalene dicarboxamide copolymer (nylon 9N/M8N), polynonamethylene terephthalamide (polyamide 9T), polynonamethylene terephthalamide/poly(2-methyloctamethylene) terephthalamide copolymer (nylon 9T/M8T), and polydecamethylene terephthalamide (polyamide 10T), more preferred is at least one selected from polynonamethylenenaphthalene dicarboxamide/poly(2-methyloctamethylene)naphthalene dicarboxamide copolymer (nylon 9N/M8N) and polynonamethylene terephthalamide/poly(2-methyloctamethylene) terephthalamide copolymer (nylon 9T/M8T), and even more preferred is polynonamethylene terephthalamide (polyamide 9T) and/or polynonamethylene terephthalamide/poly(2-methyloctamethylene) terephthalamide copolymer (nylon 9T/M8T).

The semi-aromatic polyamide is preferably capped, at both ends of the molecular chain, by a terminal capping agent. The terminal capping of the semi-aromatic polyamide can provide a resin composition having superior melt-moldability, etc. For example, the use of the semi-aromatic polyamide, whose molecular ends are capped at a rate of 10 mol % or more, can provide a resin composition having superior properties, such as melt stability and hot-water resistance.

A monofunctional compound which is reactive with a terminal amino group or a terminal carboxy group can be used as the terminal capping agent. Examples of the terminal capping agent include a monocarboxylic acid, an acid anhydride, a monoisocyanate, a monoacid halide, a monoester, a monoalcohol, and a monoamine. From the viewpoint of reactivity and the stability of capped molecular ends, a monocarboxylic acid is preferred as a terminal capping agent for a terminal amino group, and a monoamine is preferred as a terminal capping agent for a terminal carboxy group. From the viewpoint of easy handling, a monocarboxylic acid is more preferred as a terminal capping agent.

There is no particular limitation on a monocarboxylic acid for use as the terminal capping agent, and any monocarboxylic acid can be used as long as it has reactivity with an amino group. Examples of the monocarboxylic acid include an aliphatic monocarboxylic acid such as acetic acid, propionic acid, butyric acid, valeric acid, caproic acid, caprylic acid, lauric acid, tridecanoic acid, myristic acid, palmitic acid, stearic acid, pivalic acid, or isobutyric acid; an alicyclic monocarboxylic acid such as cyclopentanecarboxylic acid or cyclohexanecarboxylic acid; an aromatic monocarboxylic acid such as benzoic acid, toluic acid, α-naphthalenecarb oxylic acid, ß-naphthalenecarboxylic acid, methylnaphthalenecarboxylic acid, or phenylacetic acid; and a mixture thereof. These compounds may be used either singly or in a combination of two or more.

Among them, at least one selected from acetic acid, propionic acid, butyric acid, valeric acid, caproic acid, caprylic acid, lauric acid, tridecanoic acid, myristic acid, palmitic acid, stearic acid, and benzoic acid is preferred from the viewpoint of reactivity, the stability of capped molecular ends, cost, etc.

There is no particular limitation on a monoamine for use as the terminal capping agent, and any monoamine can be used as long as it has reactivity with a carboxy group. Examples of the monoamine include an aliphatic monoamine such as methylamine, ethylamine, propylamine, butylamine, hexylamine, octylamine, decylamine, stearylamine, dimethylamine, diethylamine, dipropylamine, or dibutylamine; an alicyclic monoamine such as cyclohexylamine or dicyclohexylamine; an aromatic monoamine such as aniline, toluidine, diphenylamine, or naphthylamine; and a mixture thereof. These compounds may be used either singly or in a combination of two or more.

Among them, at least one selected from butylamine, hexylamine, octylamine, decylamine, stearylamine, cyclohexylamine and aniline is preferred from the viewpoint of reactivity, boiling point, the stability of capped molecular ends, cost, etc.

The inherent viscosity [$\eta_{inh}$] of the semi-aromatic polyamide, measured at a concentration of 0.2 g/dl in concentrated sulfuric acid as a solvent and at a temperature of 30° C., is preferably 0.6 dl/g or more, more preferably 0.8 dl/g or more, and especially preferably 1.0 dl/g or more, while it is preferably 2.0 dl/g or less, more preferably 1.8 dl/g or less, and even more preferably 1.6 dl/g or less. When the inherent viscosity [$\eta_{inh}$] of the semi-aromatic polyamide is within the above range, the resin composition has enhanced properties such as moldability. The inherent viscosity [$\eta_{inh}$] can be determined by the following relation: $\eta_{inh}=[\ln(t_1/t_0)]/c$, where "$t_0$" represents flow-down time (sec) of the solvent (concentrated sulfuric acid), "$t_1$" represents flow-down time (sec) of a sample solution, and "c" represents the concentration (g/dl) of the sample solution (0.2 g/dl).

The semi-aromatic polyamide is preferably contained in an amount of 50 to 80% by mass per 100% by mass of the resin composition. When the content of the semi-aromatic polyamide is 50% by mass or more, the resin composition can exhibit satisfactory heat resistance. On the other hand, when the content of the semi-aromatic polyamide is 80% by mass or less, the resin composition can exhibit flexibility and good fluidity upon molding. The content of the semi-aromatic polyamide is preferably 60% by mass or more, more preferably 62% by mass or more, while it is preferably 70% by mass or less, more preferably 65% by mass or less.

[Inorganic Filler (B)]

The resin composition of the present invention contains the inorganic filler (B). The inclusion of the inorganic filler (B) can provide the resin composition with excellent strength and low water absorption properties.

There is no particular limitation on the inorganic filler (B), and any known inorganic filler can be used as long as the effect of the present invention is not impaired.

Examples of the inorganic filler (B) include a fibrous filler such as glass fibers, carbon fibers, calcium silicate fibers, potassium titanate fibers, or aluminum borate fibers; and glass flakes, talc, kaolin, mica, silicon nitride, hydrotalcite, calcium carbonate, zinc carbonate, titanium oxide, calcium monohydrogenphosphate, wollastonite, silica, zeolite, alumina, boehmite, aluminum hydroxide, calcium silicate, sodium aluminosilicate, magnesium silicate, Ketjen black, acetylene black, furnace black, carbon nanotubes, graphite, graphene, brass, copper, silver, aluminum, nickel, iron, calcium fluoride, montmorillonite, swelling fluorine mica, and apatite. These inorganic fillers may be used either singly or in a combination of two or more.

Among the above-listed inorganic fillers (B) is preferred at least one selected from the group consisting of a fibrous filler, glass flakes, talc, kaolin, mica, calcium carbonate, calcium monohydrogenphosphate, wollastonite, silica, carbon nanotubes, graphite, calcium fluoride, montmorillonite, swelling fluorine mica, and apatite, more preferred is at least one selected from the group consisting of a fibrous filler, wollastonite, and mica, and even more preferred is a fibrous filler from the viewpoint of excellent toughness, etc. Among the fibrous filler, a glass fiber and/or a carbon fiber is preferred.

The average fiber diameter of the fibrous filler used, which is generally about 0.5 to 250 μm, is preferably 3 to 100 μm, more preferably 3 to 30 μm from the viewpoint of ensuring sufficient contact area with the polyamide (A) and enhancing the mechanical strength of the molded article. The average fiber length of the fibrous filler used, which is generally about 0.1 to 10 mm, is preferably 0.2 to 5 mm, more preferably 1 to 5 mm from the viewpoint of enhancing the high-temperature strength, the heat resistance and the mechanical strength of the resin composition. The aspect ratio (L/D) of the average fiber length to the average fiber diameter is preferably 10 to 500.

A fibrous filler, having a combination of two or more of the above-described preferable average fiber diameter, average fiber length and aspect ratio, is more preferred from the viewpoint of excellent high-temperature strength, heat resistance and mechanical strength of the resin composition.

The average fiber diameter and the average fiber length of a fibrous filler can be observed and measured with an optical microscope.

There is no particular limitation on the cross-sectional shape of a fibrous filler; it may be square or circular, or a flattened shape. Examples of the flattened cross-sectional shape include a rectangular shape, a near-rectangular oval shape, an elliptical shape, a cocoon-like shape, and a cocoon-like shape whose center part in the longitudinal direction is waisted. The flatness degree of a fibrous filler, which is the ratio of the maximum cross-sectional diameter to the minimum cross-sectional diameter, is preferably 1 or more and less than 5, and more preferably 1.

The inorganic filler (B) may be surface-treated e.g. with a silane coupling agent or a titanate coupling agent as necessary. Examples of the silane coupling agent include, and are not limited to, an aminosilane coupling agent such as γ-aminopropyltriethoxysilane, γ-aminopropyltrimethoxysilane, or N-ß-(aminoethyl)-γ-aminopropylmethyldimethoxysilane; a mercaptosilane coupling agent such as γ-mercaptopropyltrimethoxysilane or γ-mercaptopropyltriethoxysilane; an epoxysilane coupling agent; and a vinylsilane coupling agent. These silane coupling agents may be used either singly or in a combination of two or more. Among the above-listed silane coupling agents, an aminosilane coupling agent is preferred.

The inorganic filler (B), preferably a fibrous filler, may be treated with a sizing agent as necessary. Examples of the sizing agent include a copolymer including, as structural units, carboxylic acid anhydride-containing unsaturated vinyl monomer units and other unsaturated vinyl monomer units other than the carboxylic acid anhydride-containing unsaturated vinyl monomer units, an epoxy compound, a polyurethane resin, a homopolymer of acrylic acid, a copolymer of acrylic acid and other copolymerizable monomer (s), and a salt thereof with a primary, secondary or tertiary amine. These sizing agents may be used either singly or in a combination of two or more.

The content of the inorganic filler (B) in the resin composition is 10 parts by mass or more and 200 parts by mass or less per 100 parts by mass of the semi-aromatic polyamide (A). If the content of the inorganic filler (B) is less than 10 parts by mass, the strength enhancing effect and the water absorption rate reducing effect of the inorganic filler (B) will be low, resulting in there is a fear of little enhancement of the strength and the hot-water resistance of the resin composition. If the content of the inorganic filler (B) is more than 200 parts by mass, there is a fear of deterioration of the moldability and the surface properties of the resin composition. From such viewpoints, the content of the inorganic filler (B) is preferably 15 parts by mass or more, more preferably 20 parts by mass or more, even more preferably 25 parts by mass or more, still more preferably 35 parts by mass or more, and yet more preferably 45 parts by mass or more, while it is preferably 140 parts by mass or less, more preferably 120 parts by mass or less, even more preferably 100 parts by mass or less, and still more preferably 60 parts by mass or less.

[Phenolic Antioxidant (C)]

The use of the phenolic antioxidant (C) having a particular structure in the resin composition can prevent molecular cleavage of polyamide caused by a radical generated from a chlorine-based oxidizing substance contained for sterilization in tap water, thereby preventing a degradation in the performance of the molded article.

Specifically, in a resin composition not containing the phenolic antioxidant (C) having a particular structure, it is presumed that a hydroxyl radical is generated from a chlorine-based oxidizing substance in the presence of water (hydroxy groups), and the radical generates a radical in the main chain of the semi-aromatic polyamide (A), which results in molecular cleavage. On the other hand, in a resin composition containing the phenolic antioxidant (C) having a particular structure, it is presumed that the phenolic antioxidant (C) inhibits an oxidation reaction by a hydroxyl radical generated from a chlorine-based oxidizing substance, thereby preventing the generation of a radical ($O_2.$). Accordingly, molecular cleavage (degradation) of the semi-aromatic polyamide (A) in water can be prevented.

In addition, in a resin composition not containing the phenolic antioxidant (C), it is presumed that a chlorine-based oxidizing substance progresses N-chlorination of the semi-aromatic polyamide (A), and also progresses ring-chlorination through the Orton rearrangement which is an irreversible reaction, which may result in cleavage of the main chain of the semi-aromatic polyamide (A). On the other hand, in a resin composition containing the phenolic antioxidant (C), it is presumed that the phenolic antioxidant (C) inhibits N-chlorination of the semi-aromatic polyamide (A), and can therefore prevent the progress of molecular cleavage (degradation) of the semi-aromatic polyamide (A).

The phenolic antioxidant (C) has a phenol structure in the molecule from the viewpoint of achieving the above effects. While there is no particular limitation on the number of phenol structures in the molecule of the phenolic antioxidant (C), it is preferably 1 to 4, more preferably 2 to 3, and especially preferably 2.

The "phenol structure" is preferably a structure represented by the following formula (1):

(1)

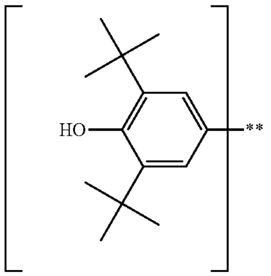

where ** represents a linking moiety.

Compared to a semi-hindered phenolic antioxidant not having the structure represented by the formula (1), a hindered phenolic antioxidant having that structure has higher stability, lower degradability and longer life, and therefore exerts the effects over a longer period of time.

From the viewpoint of enhancing compatibility with the semi-aromatic polyamide (A), the phenolic antioxidant (C) preferably has at least one of an ester group and an amide group in a moiety (hereinafter also referred to as "linker") other than the structure represented by the formula (1), and more preferably has a structure represented by the following formula (2):

(2)

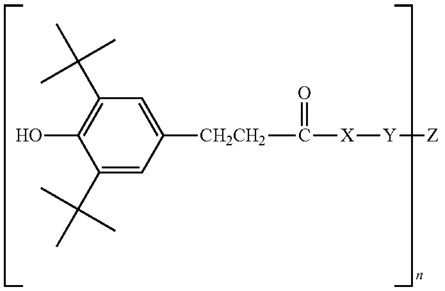

where X represents an oxygen atom or a group represented by —NH—, Y represents a single bond or an alkylene group having 1 to 17 carbon atoms, Z represents a monovalent to tetravalent organic group, and n is an integer of 1 to 4.

When n is 1, the phenolic antioxidant represented by the formula (2) is a monofunctional phenolic antioxidant, wherein Z is a monovalent organic group, and a t-butyl group is present at either ortho position with respect to the phenolic hydroxyl group (hereinafter also referred to simply as "monofunctional phenolic antioxidant"). Y is preferably an alkylene group having 1 to 17 carbon atoms.

When n is 2, the phenolic antioxidant represented by the formula (2) is a bifunctional phenolic antioxidant, wherein Z is a divalent organic group, and a t-butyl group is present at either ortho position with respect to the phenolic hydroxyl group (hereinafter also referred to simply as "bifunctional phenolic antioxidant"). Y is preferably an alkylene group having 1 to 17 carbon atoms.

When n is 3, the phenolic antioxidant represented by the formula (2) is a trifunctional phenolic antioxidant, wherein Z is a trivalent organic group, and a t-butyl group is present at either ortho position with respect to the phenolic hydroxyl group (hereinafter also referred to simply as "trifunctional phenolic antioxidant"). Y is preferably an alkylene group having 1 to 17 carbon atoms.

When n is 4, the phenolic antioxidant represented by the formula (2) is a tetrafunctional phenolic antioxidant, wherein Z is a tetravalent organic group, and a t-butyl group is present at either ortho position with respect to the phenolic hydroxyl group (hereinafter also referred to simply as "tetrafunctional phenolic antioxidant"). Y is preferably a methylene group.

Examples of the phenolic antioxidant (C) include 1,6-hexanediol bis-[3-(3,5-di-tert-butyl-4-hydroxyphenyl)propionate], 2,2-thiodiethylene bis-[3-(3,5-di-tert-butyl-4-hydroxyphenyl)propionate], 3,5-di-tert-butyl-4-hydroxybenzil phosphonate-diethyl ester, tris(3,5-di-tert-butyl-4-hydroxybenzyl)isocyanurate, tris[(3,5-di-tert-butyl-4-hydroxyphenyl) propionyloxyethyl]isocyanurate, 1,3,5-trimethyl-2,4,6-tris(3,5-di-tert-butyl-4- hydroxybenzyl)benzene, 3-(3,5-di-tert-butyl-4-hydroxyphenyl)stearyl propionate, N,N'-hexamethylene bis[3-(3,5-di-tert-butyl-4-hydroxyphenyl) propanamide], pentaerythritol tetrakis[3-(3,5-di-tert-butyl-4- hydroxyphenyl)propionate], and tris(3,5-di-tert-butyl-4-hydroxybenzyl)isocyanurate. These compounds may be used either singly or in a combination of two or more.

Among them, N, N'-hexamethylene bis[3-(3,5-di-tert-butyl-4-hydroxyphenyl)propanamide] and pentaerythritol tetrakis[3-(3,5-di-tert-butyl hydroxyphenyl)propionate] are preferred, and N, N'-hexamethylene bis[3-(3,5-di-tert-butyl-4-hydroxyphenyl)propanamide] is more preferred.

Exemplary commercial products of the phenolic antioxidant (C) include N,N'-hexamethylene bis[3-(3,5-di-tert-butyl-4-hydroxyphenyl)propanamide] (trade name: "Irganox 1098", manufactured by BASF Japan Ltd.), represented by the following formula (3), and pentaerythritol tetrakis[3-(3,5-di-tert-butyl hydroxyphenyl)propionate] (trade name: "Irganox 1010", manufactured by BASF Japan Ltd.), represented by the following formula (4):

(3)

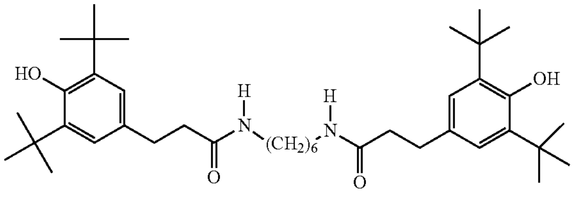

-continued (4)

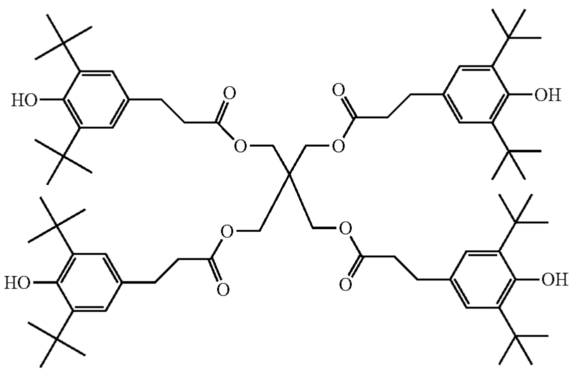

There is no particular limitation on the content of the phenolic antioxidant (C) as long as it is 0.1 parts by mass or more and 2.0 parts by mass or less per 100 pars by mass of the semi-aromatic polyamide (A). The content is preferably 0.15 parts by mass or more, more preferably 0.2 parts by mass or more, while it is preferably 1.5 parts by mass or less, more preferably 1.0 parts by mass or less.

If the content of the phenolic antioxidant (C) is less than 0.1 parts by mass per 100 pars by mass of the semi-aromatic polyamide (A), the effects of blending the phenolic antioxidant (C) may not be achieved. If the content of the phenolic antioxidant (C) is more than 2.0 parts by mass, an increased amount of a degradation product will be produced from the antioxidant, which may promote molecular cleavage (degradation) of the resin.

[Total Content of Semi-Aromatic Polyamide (A), Inorganic Filler (B) and Phenolic Antioxidant (C)]

The total content of the semi-aromatic polyamide (A), the inorganic filler (B) and the phenolic antioxidant (C) in the resin composition is preferably 80% by mass or more, more preferably 90% by mass or more, and especially preferably 95% by mass or more.

[Other Additives]

Besides the semi-aromatic polyamide (A), the inorganic filler (B) and the phenolic antioxidant (C), the resin composition may optionally contain other additives.

Examples of such other additives include a silane coupling agent such as bis(2-trimethoxysilylethyl)amine, bis(2-triethoxysilylethyl)amine, bis(3-trimethoxysilylpropyl) amine, or bis(3-triethoxysilylpropyl)amine; a stabilizer such as a copper compound; an antioxidant other than the phenolic antioxidant (C) (e.g., an amine-based antioxidant, a phosphorus-based antioxidant or a thio-based antioxidant); a colorant such as carbon black; a pigment; a fluidity improver; a UV absorber; a light stabilizer; a heat stabilizer; an antistatic agent; a flame retardant such as a brominated polymer, antimony oxide, a metal hydroxide or a phosphinate; a flame retardant aid; a crystal nucleating agent such as talc; a plasticizer; a lubricant; a dispersant; an oxygen absorber; a hydrogen sulfide absorber; a lubricating agent such as an ultra-high molecular weight polyethylene or a PTFE; an organic fibrous filler such as wholly aromatic polyamide fibers, e.g. aramid fibers; and an impact modifier such as an α-olefin copolymer or a rubber.

While there is no particular limitation on the content of each of the above-described other additives as long as the effect of the present invention is not impaired, it is preferably 0.02 to 200 parts by mass, more preferably 0.03 to 100 parts by mass per 100 pars by mass of the semi-aromatic polyamide (A).

The molecular weight retention can be enhanced due to a production merit by making the content of such an additive 0.02 parts by mass or more per 100 pars by mass of the semi-aromatic polyamide (A).

[Resin Composition Production Method]

There is no particular limitation on a method for producing the resin composition, and a method can be preferably used which can uniformly mix the semi-aromatic polyamide (A), the inorganic filler (B), the phenolic antioxidant (C), and the above-mentioned optional other additives which may be used as necessary. In general, the mixing is preferably performed by a method which involves melt-kneading the mixture using a single-screw extruder, a twin-screw extruder, a kneader, a Banbury mixer, or the like. There is no particular limitation on the melt-kneading conditions. In an exemplary method, the mixture is melt-kneaded for about 10 to 30 minutes at a temperature which is higher by about 10 to 60° C. than the melting point of the semi-aromatic polyamide (A).

The resin composition is well suited to the production of a molded article for water related application, which is intended to be used in an environment where it contacts water containing at least one of hypochlorous acid and a hypochlorite, and can be advantageously used to produce a molded article for water related application for use in faucet applications and cooking appliances.

<First Method of Use>

A first method of use according to the present invention is a method comprising using the molded article for water related application of the present invention in an environment where it contacts water containing at least one of hypochlorous acid and a hypochlorite.

<Second Method of Use>

A second method of use according to the present invention is a method comprising using a resin composition containing the phenolic antioxidant (C), or a molded article of the resin composition in an environment where it contacts water containing at least one of hypochlorous acid and a hypochlorite

[Resin Composition]

While there is no particular limitation on the resin composition for use in the second method of use according to the present invention as long as it is a resin composition containing the "phenolic antioxidant (C)" described above under the heading "Molded Article for Water Related Application", it preferably further contains a polyamide (D). In addition, the resin composition for use in the second method of use according to the present invention may further contain the "inorganic filler (B)" described above under the heading "Molded Article for Water Related Application", and the "other additives" described above under the heading "Molded Article for Water Related Application".

While there is no particular limitation on the content of the phenolic antioxidant (C), it is preferably 0.1 parts by mass or more and 2.0 parts by mass or less, more preferably 0.15 parts by mass or more and 1.5 parts by mass or less, and especially preferably 0.2 parts by mass or more and 1.0 parts by mass or less per 100 pars by mass of the polyamide (D).

While there is no particular limitation on the content of the inorganic filler (B) as an optional component, it is preferably 10 parts by mass or more and 200 parts by mass or less, more preferably 15 parts by mass or more, even more preferably 20 parts by mass or more, still more preferably 25 parts by mass or more, yet more preferably 35 parts by mass or more, and yet more preferably 45 parts by mass or more, and it is more preferably 140 parts by mass or less, even more preferably 120 parts by mass or less, still more preferably 100 parts by mass or less, and yet more preferably 60 parts by mass or less per 100 parts by mass of the polyamide (D).

While there is no particular limitation on the content of each of the other additives as optional components, it is preferably 0.02 to 200 parts by mass, more preferably 0.03 to 100 parts by mass per 100 parts by mass of the polyamide (D).

The resin composition for use in the second method of use according to the present invention is suited to any of injection molding, extrusion molding and blow molding.

[Polyamide (D)]

While there is no particular limitation on the polyamide (D), it is preferably a polyamide having 6 to 13 carbon atoms per amide group in the repeating units. When the number of carbon atoms per amide group in the repeating units of the polyamide is within the above range, the molded article can have low water absorption properties, and can therefore prevent a dimensional change due to its absorption of water. From these viewpoints, the number of carbon atoms per amide group in the repeating units is preferably 7 to 13, more preferably 8 to 13.

The polyamide (D) can be produced by using, for example, an aminocarboxylic acid, a lactam, a diamine and a dicarboxylic acid as a main raw material.

Examples of such raw materials include an aminocarboxylic acid such as 6-aminocaproic acid, 11-aminoundecanoic acid, 12-aminododecanoic acid, or para-aminomethylbenzoic acid; a lactam such as ε-caprolactam or ω-laurolactam; an aliphatic diamine such as 1,6-hexamethylenediamine, 2-methylpentamethylenediamine, 1, 7- heptamethylenediamine, 1,8-octamethylenediamine, 1, 9- nonamethylenediamine, 2-methyl-1,8-octamethylenediamine, 2-ethyl-1,7-heptanediamine, 1,10-decamethylenediamine, 1,11-undecamethylenediamine, 1,12-dodecamethylenediamine, 1,13-tridecamethylenediamine, or 5-methyl-nonamethylenediamine; an alicyclic diamine such as 1,3-bis(aminomethyl)cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl) methane, 2,2-bis(4-aminocyclohexyl)propane, bis (aminopropyl)piperazine, or aminoethylpiperazine; an aromatic diamine such as metaxylylenediamine or paraxylylenediamine; an aliphatic dicarboxylic acid such as oxalic acid, malonic acid, dimethylmalonic acid, succinic acid, glutaric acid, adipic acid, 2-methyladipic acid, pimelic acid, 2,2-dimethylglutaric acid, suberic acid, 3,3-diethylsuccinic acid, azelaic acid, sebacic acid, dodecanedioic acid, or dimer acid; an alicyclic dicarboxylic acid such as 1,3-cyclohexanedicarboxylic acid or 1,4-cyclohexanedicarboxylic acid; and an aromatic dicarboxylic acid such as terephthalic acid, isophthalic acid, phthalic acid, 1,4-naphthalenedicarboxylic acid, 2,6-naphthalenedicarboxylic acid, 2,7-naphthalenedicarboxylic acid, 1,4-phenylenedioxy-diacetic acid, 1,3-phenylenedioxy-diacetic acid, diphenic acid, 4,4'-oxydibenzoic acid, diphenylmethane-4,4'-dicarboxylic acid, diphenylsulfone-4,4'-dicarboxylic acid, or 4,4'-biphenyldicarboxylic acid.

Homopolymers or copolymers, derived from these raw materials, may be used either singly or in a combination of two or more.

Examples of the polyamide (D) include polycaproamide (nylon 6), polyhexamethylene adipamide (nylon66), polytetramethylene adipamide (nylon46), polytetramethylene sebacamide (nylon 410), polypentamethylene adipamide (nylon 56), polypentamethylene sebacamide (nylon 510), polyhexamethylene sebacamide (nylon 610), polyhexamethylene dodecamide (nylon 612), polydecamethylene adipamide (nylon 106), polydecamethylene sebacamide (nylon 1010), polydecamethylene dodecamide (nylon 1012), polyundecanamide (nylon 11), polydodecanamide (nylon 12), polycaproamide/polyhexamethylene adipamide copolymer (nylon 6/66), polytetramethylene terephthalamide (polyamide 4T), polypentamethylene terephthalamide (polyamide 5T), polyhexamethylene terephthalamide (polyamide 6T), polytetramethylene terephthalamide/polyhexamethylene terephthalamide (nylon 6T/4T), polyhexamethylene adipamide/polyhexamethylene terephthalamide/polytetramethylene terephthalamide/polytetramethylene adipamide (nylon 66/6T/4T/46), polyhexamethylene terephthalamide/polycaproamide copolymer (nylon 6T/6), polyhexamethylene terephthalamide/polyundecanamide copolymer (nylon 6T/11), polyhexamethylene terephthalamide/polydodecanamide copolymer (nylon 6T/12), polyhexamethylene adipamide/polyhexamethylene terephthalamide copolymer (nylon 66/6T), polyhexamethylene adipamide/polyhexamethylene isophthalamide copolymer (nylon 66/6I), polyhexamethylene adipamide/polyhexamethylene isophthalamide/polycaproamide copolymer (nylon 66/6I/6), polyhexamethylene adipamide/polyhexamethylene terephthalamide/polyhexamethylene isophthalamide copolymer (nylon 66/6T/6I), polyhexamethylene terephthalamide/polyhexamethylene isophthalamide copolymer (nylon 6T/6I), polyhexamethylene terephthalamide/poly(2-methylpentamethylene) terephthalamide copolymer (nylon 6T/M5T), polynonamethylene terephthalamide (polyamide 9T), poly (2-methyloctamethylene) terephthalamide (nylon M8T), polynonamethylene terephthalamide/poly(2-methyloctamethylene) terephthalamide copolymer (nylon 9T/M8T), polydecamethylene terephthalamide (polyamide 10T), polyundecamethylene terephthalamide (polyamide 11T), polydodecamethylene terephthalamide (polyamide 12T), polypentamethylene terephthalamide/polydecamethylene terephthalamide copolymer (polyamide 5T/10T), polydecamethylene terephthalamide/polyhexamethylene dodecanamide copolymer (polyamide 10T/nylon 612), a copolymer of polyamide 6T and polyamide 10T (polyamide 6T/10T), polydecamethylene terephthalamide/polyhexamethylene adipamide copolymer (polyamide 10T/nylon 66), polyhexamethylene adipamide/polyhexamethylene terephthalamide/polydecamethylene terephthalamide/polydecamethylenemethylene adipamide (nylon 66/polyamide 6T/polyamide 10T/nylon 106), a copolymer of polyamide 10T and polyundecanamide (polyamide 11) (polyamide 10T/11), polynonamethylenenaphthalene dicarboxamide (polyamide 9N), poly(2-methyloctamethylene)naphthalene amide (nylon M8N), polynonamethylenenaphthalene dicarboxamide/poly(2-methyloctamethylene)naphthalene dicarboxamide copolymer (nylon 9N/M8N), polyhexamethylene isophthalamide (polyamide 6I), a copolymer of polyamide 6I and polyamide 6T (polyamide 6I/6T), a copolymer of polyamide 66, polyamide 6I and polyamide 6T (polyamide 66/polyamide 6I/6T), a copolymer of polyamide 6T and polyundecanamide (polyamide 11) (polyamide 6I/11), polyhexamethylenecyclohexane carboamide (nylon 6C), polyhexamethylenecyclohexane carboxamide/poly(2-methylpentamethylene)cyclohexane carboamide copolymer (nylon 6C/M5C), polynonamethylenecyclohexane carboamide (nylon 9C), poly(2-methyloctamethylene)cyclohexane carboamide (nylon M8C), polynonamethylenecyclohexane carboamide/poly(2-methyloctamethylene)cyclohexane carboamide copolymer (nylon 9C/M8C), and mixtures and copolymers thereof. These polymers may be used either singly or in a combination of two or more.

Among them, polynonamethylene terephthalamide (polyamide 9T), polynonamethylene terephthalamide/poly(2-methyloctamethylene) terephthalamide copolymer (nylon 9T/M8T), polydecamethylene terephthalamide (polyamide 10T), polynonamethylene naphthamide (nylon 9N), poly(2-methyloctamethylene)naphthalene amide (nylon M8N), polynonamethylenenaphthamide/poly(2-methyloctamethylene)naphthamide copolymer (nylon 9N/M8N), polynonamethylenecyclohexane carboamide (nylon 9C), poly(2-methylocatamethylene)cyclohexane carboamide (nylon M8C), and polynonamethylenecyclohexane carboamide/poly(2-methyloctamethylene)cyclohexane carboamide copolymer (nylon 9C/M8C) are preferred from the viewpoint of enhanced strength and low water absorption properties of the molded article.

The polyamide (D) is preferably a semi-aromatic polyamide having an aromatic ring in a repeating structural unit, and more preferably the semi-aromatic polyamide (A) including dicarboxylic acid units composed mainly of aromatic dicarboxylic acid units, and diamine units composed mainly of aliphatic diamine units, described above under the heading "Molded Article for Water Related Application" from the viewpoint of enhanced strength and low water absorption properties of the molded article.

—Semi-Aromatic Polyamide (A)—

While there is no particular limitation on the semi-aromatic polyamide (A) as long as it is a polyamide including dicarboxylic acid units composed mainly of aromatic dicarboxylic acid units, and diamine units composed mainly of aliphatic diamine units, it is preferably a polyamide including dicarboxylic acid units composed mainly of aromatic dicarboxylic acid units, and diamine units composed mainly of aliphatic diamine units having 4 to 10 carbon atoms.

The "aromatic dicarboxylic acid units" and the "aliphatic diamine units having 4 to 10 carbon atoms (structural units derived from an aliphatic diamine having 4 to 10 carbon atoms)" have been described above under the heading "Molded Article for Water Related Application".

EXAMPLES

The following examples and comparative example illustrate the present invention in greater detail and are not intended to limit the scope of the invention.

Evaluations in Production Example, Examples, and Comparative Example were performed by the following methods.

(Production of Test Specimen)

Using an injection molding machine (mold clamping force: 100 tons, screw diameter: 32 mm), manufactured by Sumitomo Heavy Industries, Ltd., an ISO multi-purpose test specimen A-type dumbbell (thickness 4 mm, entire length 170 mm, length of parallel portion 80 mm, width of parallel portion 10 mm) for evaluation was produced from each of resin compositions (pellets), obtained in Examples and Comparative Example, by means of a T-runner mold under the conditions of a cylinder temperature of 320° C. and an actual mold temperature of 140° C.

<Measurement of Tensile Strength>

Using Autograph (manufactured by Shimadzu Corporation), a test specimen produced in the above-described manner was subjected to measurement of tensile strength (tensile yield strength) at 23° C. according to ISO 527-1.

<Measurement of Molecular Weight Retention>

A test specimen produced in the above-described manner was immersed in an aqueous sodium hypochlorite solution having a concentration of 1000 ppm, whose temperature was kept at 80° C., for 96 hours. The aqueous solution was changed for a new one every 24 hours. The molecular weight of the test specimen was measured before and after the immersion, and the molecular weight retention (%) was determined according to the following equation:

$$\text{Molecular weight retention (\%)}=M_{n2}/M_{n1}\times 100$$

where $M_{n1}$ is the number average molecular weight of the test specimen before the immersion, and $M_{n2}$ is the number average molecular weight of the test specimen after the immersion.

The measurement of the number average molecular weight was performed at 40° C. using HLC-8320 GPC, manufactured by Tosoh Corporation, with TSK-gel SuperHM-N columns, manufactured by Tosoh Corporation, and using hexafluoro-2-propanol containing 10 mM trifluoroacetic acid as an eluent, followed by calculation in terms of polymethyl methacrylate.

The following components were used to prepare resin compositions in Examples and Comparative Example.

(Semi-Aromatic Polyamide (A))

Production Example 1: Production of Polyamide 9T (PA9T) (Polyamide 9T, Number of Carbon Atoms Per Amide Group in Repeating Units: 8.5)

7917 g of 1,9-nonanediamine, 1979 g of 2-methyl-1,8-octanediamine (1,9-nonanediamine:2-methyl-1,8-octanediamine=80:20 (molar ratio)), 10031 g of terephthalic acid, 149 g of benzoic acid, 20 g of sodium hypophosphite monohydrate and 5000 g of water were placed into a reactor, and the reactor was purged with nitrogen. The temperature in the reactor was raised to 220° C. in 3 hours, while the pressure in the reactor (autoclave) increased to 2 MPa. Thereafter, the mixture was allowed to react for 4 hours while keeping the pressure in the reactor at 2 MPa by gradually discharging water vapor from the reactor. Subsequently, the pressure in the reactor was lowered to 1.2 MPa in 30 minutes to obtain a prepolymer. The prepolymer was ground, and dried at 120° C. under reduced pressure for 12 hours. The dried prepolymer was subjected to solid-phase polymerization under the conditions of 200° C. and 13.3 Pa for 2 hours, and then under the conditions of 235° C. and 13.3 Pa to obtain a polyamide 9T (PA9T) having a melting point of 300° C.

(Inorganic Filler (B))

Glass fibers: (T-251H, manufactured by Nippon Electric Glass Co., Ltd., average fiber diameter 10.5 μm, average fiber length 3 mm, flatness degree 1)

(Antioxidant (C))

Hindered phenol: N,N'-hexamethylene bis[3-(3,5-di-tert-butyl-4-hydroxyphenyl)propanamide] (Irganox 1098, manufactured by BASF Japan Ltd.)

Semi-hindered phenol: 3,9-bis[2- [3- (3- tert-butyl-4-hydroxy-5-methylphenyl)propionyloxy]-1, 1- dimethylethyl]-2,4,8,10-tetraoxaspiro[5.5] undecane (SUMILIZER (registered trademark) GA-80, manufactured by Sumitomo Chemical Co., Ltd.)

(Other Additives)

Crystal nucleating agent: talc (HM4, manufactured by IMI Fabi S.p.A)

Colorant: carbon black (Monarch 4750, manufactured by Cabot Corporation)

Example 1

100 parts by mass of the polyamide 9T (PA9T) as a semi-aromatic polyamide (A), produced in Production Example 1, 0.2 parts by mass of N,N'-hexamethylene bis [3-(3,5-di-tert-butyl-4-hydroxyphenyl)propanamide] (Irganox 1098, manufactured by BASF Japan Ltd.) as an antioxidant (C), 0.1 parts by mass of talc (HM4, manufactured by IMI Fabi S.p.A) as a crystal nucleating agent, and 0.2 parts by mass of carbon black (Monarch 4750, manufactured by Cabot Corporation) as a colorant were mixed. The mixture was fed into a twin-screw extruder ("TEM-2655", manufactured by Toshiba Machine Co., Ltd.) from a hopper provided upstream of the extruder and, at the same time, 54 parts by mass of T-251H (glass fibers) as an inorganic filler (B) was fed into the extruder from a side feed inlet provided on the downstream side of the extruder. The mixture was melt-kneaded and extruded under the condition of a cylinder temperature of 320° C., followed by cooling and cutting to produce a resin composition in the form of pellets.

Examples 2 and 3, and Comparative Example 1

Resin compositions were produced in the same manner as in Example 1 using the components in the kind and the amounts (contents) indicated in Table 1.

Test specimens for evaluation were produced using each of the resin compositions obtained in the Examples and the Comparative Example, and the test specimens were subjected to the above-described property evaluation tests. The results are shown in Table 1.

TABLE 1

| | | | | Ex. 1 | Ex. 2 | Ex. 3 | Comp. Ex. 1 |
|---|---|---|---|---|---|---|---|
| Composition (parts by mass) | Semi-aromatic polyamide (A) | | PA9T | 100 | 100 | 100 | 100 |
| | Inorganic filler (B) | | T-251H | 54 | 54 | 54 | 54 |
| | Antioxidant (C) | Hindered phenol | Irganox 1098 | 0.2 | 1.0 | 2.0 | — |
| | | Semi-hindered phenol | GA80 | — | — | — | 0.2 |
| | Crystal nucleating agent | | Talc HM4 | 0.1 | 0.1 | 0.1 | 0.1 |
| | Colorant | | Monarch 4750 | 0.2 | 0.2 | 0.2 | 0.2 |

TABLE 1-continued

| | | Ex. 1 | Ex. 2 | Ex. 3 | Comp. Ex. 1 |
|---|---|---|---|---|---|
| Properties | Tensile strength (MPa) | 193 | 193 | 192 | 198 |
| | Number average molecular weight before immersion $M_{n1}$ | 7900 | 8200 | 7900 | 7700 |
| | Molecular weight retention (%) | 74 | 74 | 65 | 54 |

The data in Table 1 shows that compared to the resin composition of Comparative Example 1 which contains the semi-hindered phenolic antioxidant (GA-80) not having a structure represented by the formula (1) in the molecule, the resin compositions of Examples 1 to 3 which each contain, in an amount in the range of 0.1 to 2.0 parts by mass, the hindered phenolic antioxidant (Irganox 1098) having a structure represented by the formula (1) in the molecule can enhance the molecular weight retention while maintaining the tensile strength. A higher molecular weight retention indicates superior long-term oxidation resistance. Thus, the data verifies that the molded article for water related application of the present invention is excellent in long-term oxidation resistance.

This is considered to be due to the fact that the hindered phenolic antioxidant (Irganox 1098) having a structure represented by the formula (1) in the molecule has a longer life (i.e., maintains activity over a longer period of time) than the semi-hindered phenolic antioxidant (GA-80) not having a structure represented by the formula (1) in the molecule.

It is to be noted that the content of the antioxidant (C) in the resin composition of Example 3, which is 2.0 parts by mass, is higher than those in the resin compositions of Examples 1 and 2. Therefore, the resin composition of Example 3 has a lower molecular weight retention than the resin compositions of Examples 1 and 2.

The invention claimed is:

1. A molded article for water related application, comprising a resin composition comprising:

100 parts by mass of a semi-aromatic polyamide (A);

10 to 200 parts by mass of an inorganic filler (B); and 0.1 to 2.0 parts by mass of a phenolic antioxidant (C), wherein the semi-aromatic polyamide (A) includes dicarboxylic acid units composed mainly of aromatic dicarboxylic acid units, and diamine units composed mainly of aliphatic diamine units, and wherein the phenolic antioxidant (C) has, in the molecule, a structure represented by the following formula (1):

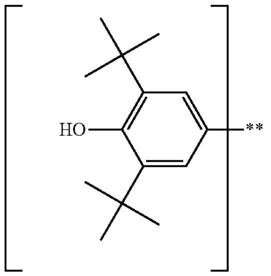

(1)

where ** represents a linking moiety; and wherein all of the diamine units in the semi-aromatic polyamide are derived from an aliphatic diamine having 9 or 10 carbon atoms.

2. The molded article for water related application according to claim 1, wherein the resin composition contains the phenolic antioxidant (C) in an amount of 0.1 to 1.0 parts by mass per 100 parts by mass of the semi-aromatic polyamide (A).

3. The molded article for water related application according to claim 1, wherein 50 to 100 mol % of the dicarboxylic acid units are structural units derived from at least one of terephthalic acid and naphthalenedicarboxylic acid.

4. The molded article for water related application according to claim 1, wherein the phenolic antioxidant (C) further has at least one of an ester group and an amide group.

5. The molded article for water related application according to claim 1, having a thickness of 0.5 mm or more.

6. A method comprising using the molded article for water related application according to claim 1 in an environment where it contacts water containing at least one of hypochlorous acid and a hypochlorite.

7. A method comprising using a resin composition or a molded article of the resin composition of claim 1 in an environment where it contacts water containing at least one of hypochlorous acid and a hypochlorite.

* * * * *